United States Patent
Legge

(10) Patent No.: US 7,938,047 B2
(45) Date of Patent: *May 10, 2011

(54) TUBE END MILLING HEAD

(75) Inventor: David Legge, Franklin, MA (US)

(73) Assignee: Esco Technologies, Inc., Holliston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/592,503

(22) Filed: Nov. 25, 2009

(65) Prior Publication Data

US 2010/0074699 A1    Mar. 25, 2010

Related U.S. Application Data

(63) Continuation of application No. 11/901,529, filed on Sep. 18, 2007, now Pat. No. 7,648,313.

(60) Provisional application No. 60/845,677, filed on Sep. 19, 2006.

(51) Int. Cl.
B23B 5/14    (2006.01)
B23B 5/00    (2006.01)

(52) U.S. Cl. .............................................. 82/46; 407/33

(58) Field of Classification Search .................... 407/33, 407/34, 53, 113, 35; 82/46
See application file for complete search history.

(56) References Cited

U.S. PATENT DOCUMENTS

| | | | | |
|---|---|---|---|---|
| 5,496,137 A | * | 3/1996 | Ochayon et al. | 408/226 |
| 6,273,650 B1 | * | 8/2001 | Jordberg | 407/102 |
| 6,871,859 B2 | * | 3/2005 | Lundblad et al. | 279/102 |
| 6,955,507 B2 | * | 10/2005 | Hall | 407/33 |
| 7,390,149 B2 | * | 6/2008 | Wihlborg | 407/35 |

* cited by examiner

*Primary Examiner* — Will Fridie, Jr.
(74) *Attorney, Agent, or Firm* — Devine, Millimet & Branch; Paul C. Remus; Raymond I. Bruttomesso, Jr.

(57) ABSTRACT

A tube end rotary milling head with cylindrical cutting pieces removably secured to the milling head by forces exerted by the material being cut and by friction without any separate securing elements.

3 Claims, 2 Drawing Sheets

TUBE END MILLING HEAD

CROSS-REFERENCE TO RELATED APPLICATIONS

The present application is a continuation of patent application Ser. No. 11/901,529, filed Sep. 18, 2007, now U.S. Pat. No. 7,648,313 which claims the benefit of Provisional Patent Application Ser. No. 60/845,677, filed Sep. 19, 2006, both of which are incorporated herein by reference.

TECHNICAL FIELD

The present invention relates to a milling head. More specifically, it relates to a milling head that prepares a tube end, including among other types of tube ends, a boiler tube end, for subsequent welding.

BACKGROUND OF THE INVENTION

Boiler tubes are generally arranged in large panels or banks of parallel tubes that are connected together with a metal membrane. In some cases a weld overlay comprising a metal or alloy is placed on portions of the tube bank in an effort to prevent corrosion.

Because of corrosion, boiler tubes occasionally require replacement. Ordinarily, replacement of tubes involves cutting and removal of relatively large sections of the existing panel of tubes and replacement with a new panel of tubes.

The section of the panel of tubes that is to be replaced is generally cut out using a power saw or a cutting torch. After the section that is to be replaced has been removed, it is necessary properly to prepare the tube ends of the remaining panel of tubes exposed by the removal of the section. Preparation of the tube ends requires beveling of the tube ends to facilitate a good weld. To facilitate efficient beveling of the tube ends, it is highly desirable to remove a portion of the membrane and weld overlay between each pair of exposed tube ends. It is also desirable to remove any film from the tube ends. In addition, there are other circumstances in which various materials must be removed from a tube end.

The prior art contains milling heads that perform one or more of the membrane, weld overlay and film removal steps. For example, such a milling head is disclosed in U.S. Pat. No. 6,955,507, incorporated herein by reference.

However, the cutting blades, and the means to secure them to the milling heads, of the prior art are susceptible to breaking. Moreover, the cutting blades are generally secured to the milling heads of the prior art by screws. When such a screw breaks, a portion of the screw is left in the hole in which it was threaded. It is difficult and time consuming to extract this portion of the screw from the threaded hole so that a replacement blade may be secured to the milling head by another screw. It is, therefore, an object of the present invention to provide a tube end milling head with cutting means that are less susceptible to breaking and that can be replaced quickly and efficiently in the event that they do break.

SUMMARY

The present invention is a tube end milling head including cutting pieces with circular cutting faces that are inserted in holes in the milling head and are removably secured therein by forces exerted on the cutting pieces by the material being cut and by friction without any separate means for securing the cutting pieces to the milling head.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
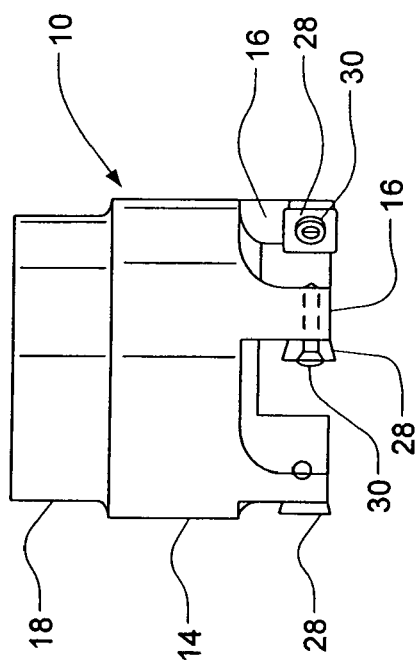
FIG. 1 is a side view of one embodiment of a milling head in the prior art.
Figure 2:
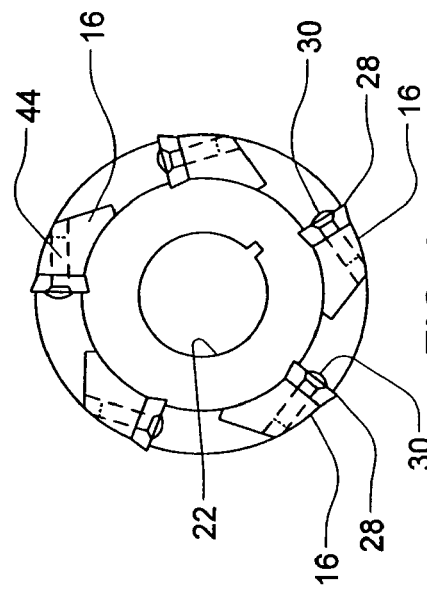
FIG. 2 is a bottom view of the milling head of FIG. 1.

As shown in FIGS. 1 and 2, a milling head described in the prior art 10 includes a plurality of axially extending radial cutting blade supports 16 at one end and a tool mounting portion 18 at the other end with body 14 between them. The mounting portion 18 has a cylindrical bore 22 for removably receiving rotary gearing of a rotary milling tool. Various means for mounting the head known to the art can be utilized.

A cutting blade 28 is removably secured to each of the cutting blade supports 16 by means of a securing element 30 such as a screw or fastener received in the threaded bore 44 for each of the cutting blades supports 16.

The cutting blades 28 are generally square-shaped and have at least three cutting edges, with one cutting edge being generally perpendicular to the rotational axis of the milling head 10, and the other two cutting edges being parallel to the rotational axis of the milling head.

It is noted in the prior art (U.S. Pat. No. 6,955,507, page 7, lines 16-23) that other cutting blade shapes, such as triangular-shaped blades, can be used but are less desirable. It is also noted that, it is not necessary that one of the cutting edges of each of the blades be perpendicular to the rotational axis of the milling head but that, square blades arranged with one of the cutting edges being perpendicular to the rotational axis of the milling head are highly preferred because they provide the greatest cutting efficiency and lowest potential for damage and wear of the blades.

The present invention is a tube end milling head including cutting pieces with circular cutting faces that are inserted in holes in the milling head and are held therein by the forces exerted by the material being cut or removed against the cutting pieces and by friction without any separate means for securing the cutting pieces to the milling head.

Figure 3:
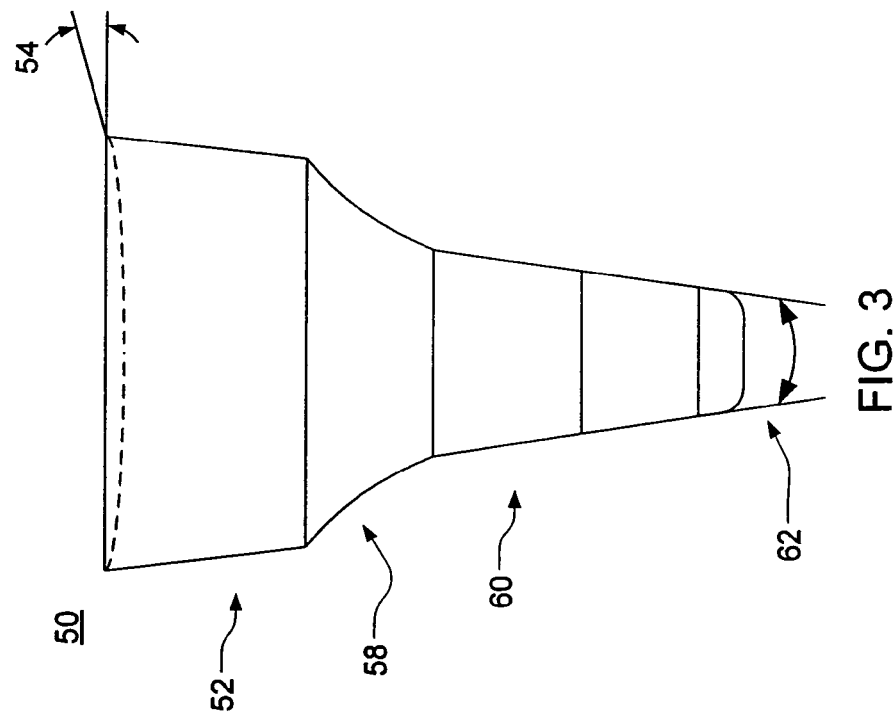
FIG. 3 is a side view of a cutting piece of a preferred embodiment of the present invention.

Referring to FIG. 3 a cutting piece 50 comprises a cylindrical cutting blade 52 with a first side being the cutting face 54 and a second side 58 that is attached to a cutting piece body 60 in the shape of a truncated conical section. The larger end 59 of the cutting piece body 60 is attached to the second side 58 of the cutting blade 52. In this embodiment the cutting face 54 is circular and concave. The cutting piece is made of tungsten carbide or high-speed steel. The cutting piece 50 is commercially available through Mitsubishi. It is marketed for mounting in a stationary position as opposed to the position on the rotating milling head of the present invention.

Figure 4:
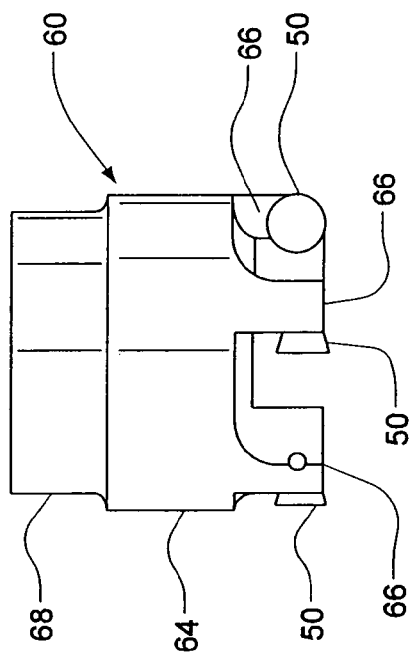
FIG. 4 is a side view of a preferred embodiment of the milling head of the present invention.
Figure 5:
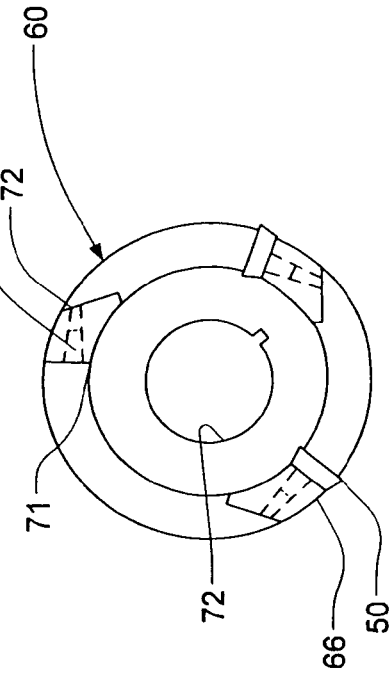
FIG. 5 is a bottom view of the preferred embodiment of the milling head in FIG. 3.

As shown in FIGS. 4 and 5, a preferred embodiment of the present invention includes a milling head body 61 with a plurality of axially extending radial cutting piece supports 66 attached to a first side 64. The first side also has a hole 67 extending through the first side of a diameter larger than the tube end to be prepared. The milling head body 61 is rotatable around a center of rotation that is the center of the hole 67. It has a second side 68 adapted to be connected to a means of rotation, for example by having a cylindrical bore for removably receiving rotary gearing of a rotary milling tool. Various other means for rotating the milling head known to the art can also be utilized.

Each of the cutting piece supports has a hole 70 in its face 71 with walls forming a truncated conical section of approximately the same size and shape as the truncated conical section of a cutting piece body 60. The hole 70 is extended through a side or the back 72 of the cutting piece support, the extension being preferably in the shape of a cylinder of a diameter of approximately the same size as the diameter of the smaller end 62 of truncated conical cutting piece body 60.

A cutting piece 50 is removably secured to a cutting blade support 66 by the force exerted by the material being cut or removed against the cutting piece and by friction between the truncated conical cutting piece body 60 of the cutting piece 50 and the walls of the hole 70 in the cutting piece support 66. If a cutting blade 52 breaks off a cutting piece 50, the portion of the cutting piece remaining in the hole 70 in the cutting piece support 66 can be removed by inserting a tool (not shown) into the extension of the hole through a side or the back 72 of the cutting piece support 66 and simply pushing the remaining portion of the cutting piece 50 out of the hole.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A rotary milling head for preparing a tube end comprising,
    a milling head body with a first side and a second side adapted to be connected to a means of rotation,
    a plurality of axially extending cutting piece supports attached to the first side of the milling head body, each cutting piece support having a face, sides and a back, each cutting piece support further having a hole in its face with walls, said walls having first the shape of a truncated conical section with a large end and a small end, the large end being closer to the face, and then a generally cylindrical shape continuing through a side or the back of the cutting piece support, and
    a plurality of cutting pieces, each cutting piece comprising a cutting blade with a first side being the cutting face and a second side attached to a cutting piece body in the shape of a truncated conical section of approximately the same size and shape as the walls of a hole in a cutting piece support, such that the cutting piece is removably secured in the hole by forces exerted on it by material being cut and friction between the cutting piece body and the walls of the hole without any other securing means.

2. The rotary milling head of claim 1 wherein the face of the cutting blade is circular.

3. A rotary milling head for preparing a tube end comprising,
    a milling head body with a first side and a second side adapted to be connected to a means of rotation, which milling head body is rotatable around a center of rotation,
    a plurality of cutting pieces, each cutting piece comprising a cutting blade with a first side being the cutting face and a second side attached to a cutting piece body in the shape of a truncated conical section, and
    a plurality of axially extending cutting piece supports attached to the first side of the milling head body, each cutting piece support having a face, sides and a back, each cutting piece support further having a hole in its face with walls, said walls having first the shape of a truncated conical section of approximately the same size and shape as the cutting piece body, and then a generally cylindrical shape continuing through a side or the back of the cutting piece support, such that the cutting piece is removably secured in the hole and can be removed by inserting a tool into the continuation of the hole through a side or the back of the cutting piece support and pushing the cutting piece out of the hole.

* * * * *